United States Patent
Lefevere et al.

(10) Patent No.: US 7,508,978 B1
(45) Date of Patent: *Mar. 24, 2009

(54) DETECTION OF GROOVES IN SCANNED IMAGES

(75) Inventors: Francois-Marie Lefevere, Mountain View, CA (US); Marin Saric, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 821 days.

This patent is subject to a terminal disclaimer.

(21) Appl. No.: 10/938,727

(22) Filed: Sep. 13, 2004

(51) Int. Cl.
*G06K 9/00* (2006.01)

(52) U.S. Cl. ............... 382/154; 382/276; 382/285; 358/488; 358/530; 345/419; 348/E13.002; 348/E13.003

(58) Field of Classification Search ............... 382/100, 382/131, 294, 215, 285, 154, 293, 276, 128; 358/474, 497, 488, 471, 493, 530, 400, 466; 715/209, 274; 600/407, 426; 345/427, 419, 345/421, 422, 418; 250/208.1, 226; 356/402; 355/25, 23; 399/361, 362; 348/E13.025, 348/E13.003, E13.002, E13.001; 707/E17.11; 378/23

See application file for complete search history.

(56) References Cited

U.S. PATENT DOCUMENTS

| | | | | | |
|---|---|---|---|---|---|
| 5,362,958 | A | * | 11/1994 | Ando | 250/208.1 |
| 5,886,342 | A | * | 3/1999 | Matsui | 250/208.1 |
| 5,969,829 | A | * | 10/1999 | Matsuda et al. | 358/475 |
| 5,995,245 | A | * | 11/1999 | Moro | 358/474 |
| 6,014,470 | A | * | 1/2000 | Matsuda | 382/275 |
| 6,940,664 | B1 | * | 9/2005 | Pilu | 359/806 |
| 6,996,290 | B2 | * | 2/2006 | Cariffe | 382/275 |
| 7,072,527 | B1 | * | 7/2006 | Nako | 382/290 |

* cited by examiner

*Primary Examiner*—Sheela C Chawan
(74) *Attorney, Agent, or Firm*—Harrity & Harrity, LLP

(57) ABSTRACT

A system and method locate a central groove in a document such as a book, magazine, or catalog. In one implementation, scores are generated for points in a three-dimensional image that defines a surface of the document. The scores quantify a likelihood that a particular point is in the groove. The groove is then detected based on the scores. For example, lines may be fitted through the points and a value calculated for the lines based on the scores. The line corresponding to the highest calculated value may be selected as the line that defines the groove.

41 Claims, 10 Drawing Sheets

DETECTION OF GROOVES IN SCANNED IMAGES

BACKGROUND

A. Field of the Invention

Systems and methods described herein relate to image scanning and, more particularly, to techniques for scanning and locating features in documents.

B. Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, are the more traditional printed works of authorship, such as books, catalogs, and magazines. One impediment to making such works digitally available is that it can be difficult to convert printed versions of the works to digital form. Optical character recognition (OCR), which is the act of using an optical scanning device to generate images of text that are then converted to characters in a computer readable format (e.g., an ASCII file), is a known technique for converting printed text to a useful digital form. OCR systems generally include an optical scanner for generating images of printed pages and software for analyzing the images.

One problem with using OCR in the context of printed documents such as books is that books are generally bound in a manner that can make it difficult to generate high quality images of the pages. For OCR, it is desirable to generate the images of the printed pages from flat, two-dimensional, versions of the pages. Books generally have spines, however, that can cause the pages to have a more three-dimensional profile. This can cause difficulties when analyzing images of the book pages.

SUMMARY OF THE INVENTION

One aspect is directed to a system that includes a stereoscopic camera to generate images of opposing pages of a document from which a three-dimensional image of a surface of the opposing pages of the document is generated. The system further includes control logic to process the three-dimensional image to locate a groove between the opposing pages of the document that is defined by the spine of the document.

Another aspect is directed to a computer-implemented method for detecting a groove caused by a spine of a document. The method includes generating scores for points in a three-dimensional image that defines a surface of the document, where the scores quantify a likelihood that a particular point is in the groove. The method further includes detecting the groove based on the generated scores.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

Figure 1:
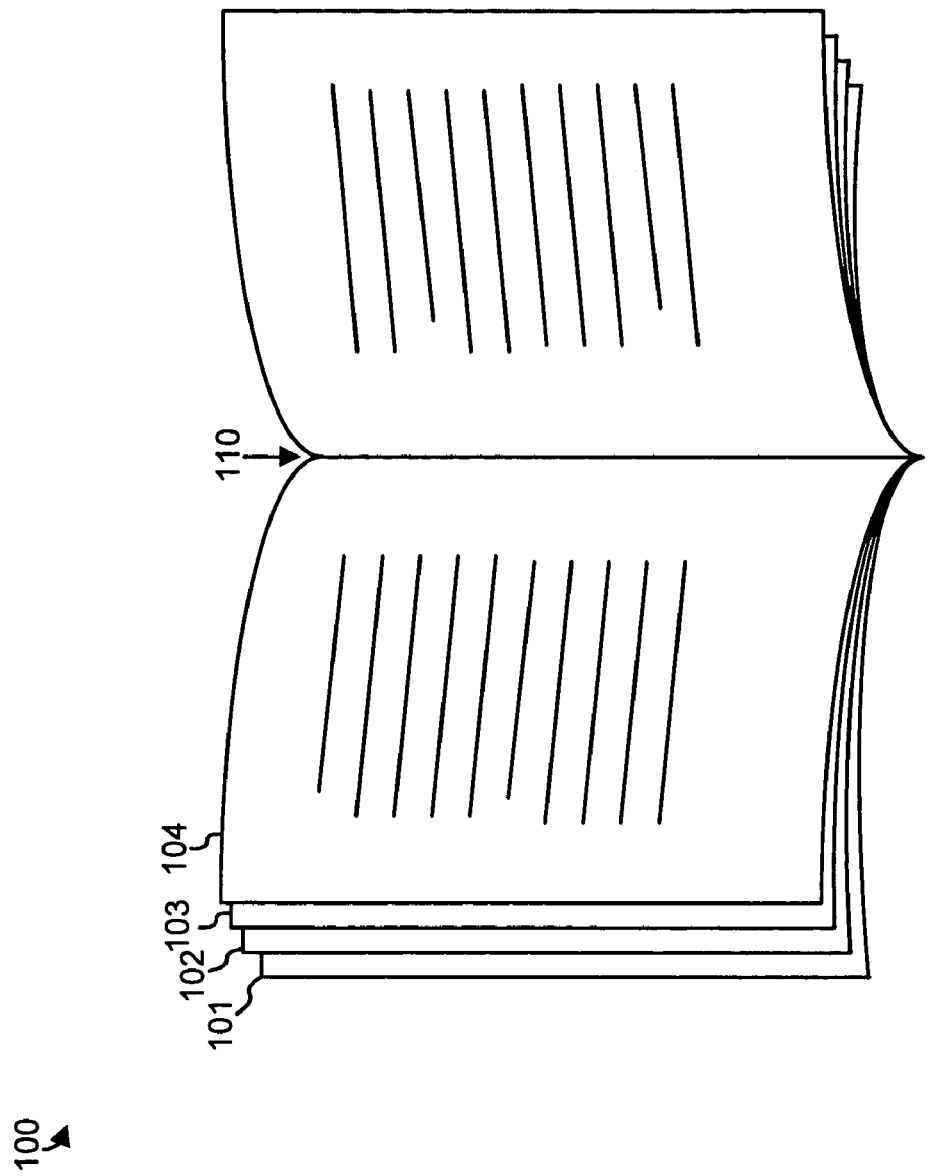
FIG. 1 is a diagram illustrating a book that is to be scanned.

FIG. 1 is a diagram illustrating a book 100 that is to be scanned. Pages 101-104 of book 100 emanate from a central groove 110 that is defined by the spine of the book. Page 104 is shown as the opened-to left page of the book. In contrast to a page of paper placed flat on a surface, page 104 includes a three-dimensional profile.

It may be desirable to perform image processing functions, such as OCR functions, on the scanned images of book 100. Before performing such functions, it can be useful to automatically locate certain features of the book, such as central groove 110, in the images of the book.

Figure 2:
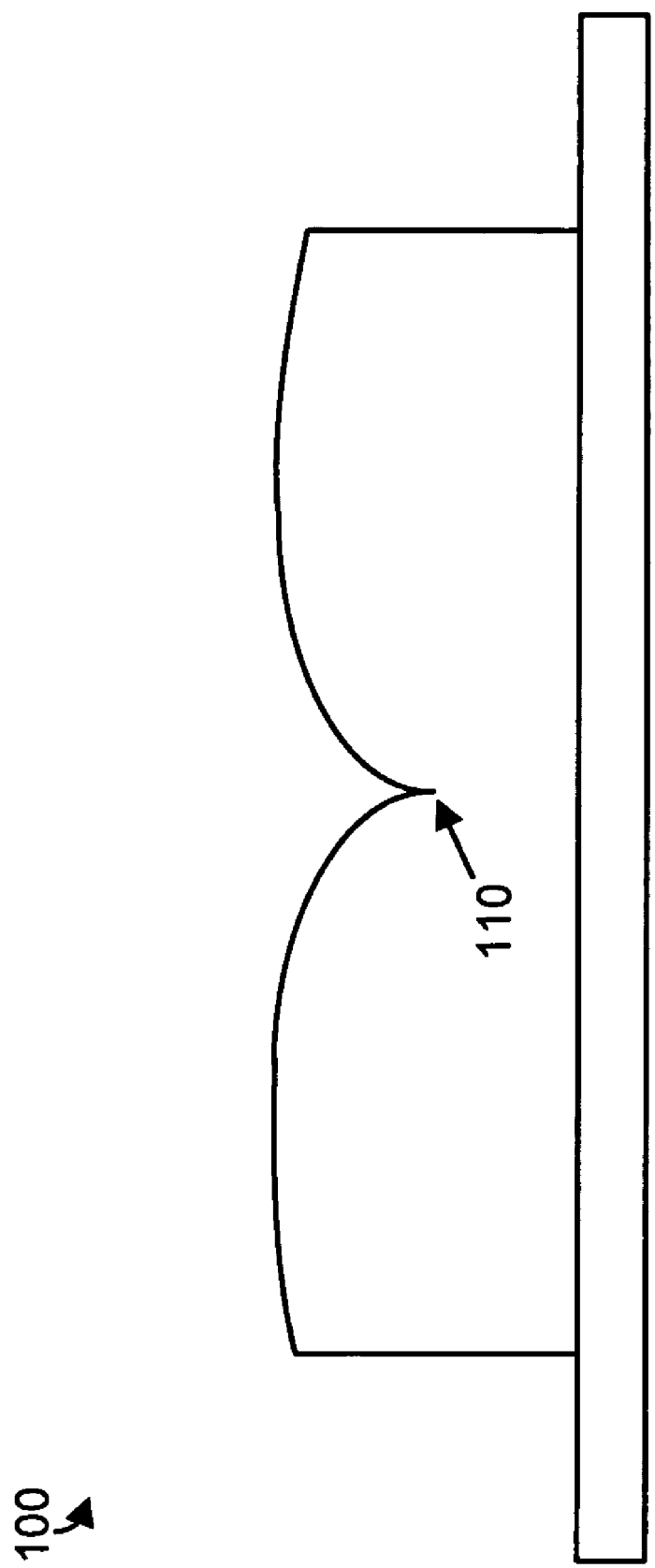
FIG. 2 is a diagram illustrating a frontal view of the book shown in FIG. 1.

FIG. 2 is a diagram illustrating a frontal view of book 100. From this view, it can be seen that groove 110 is generally defined by a dip or "hole" located in the vicinity of the middle of the book. Consistent with aspects of the invention, a central groove, such as groove 110, may be automatically located and identified in a three-dimensional image of surface of a document.

System Overview

Figure 3:
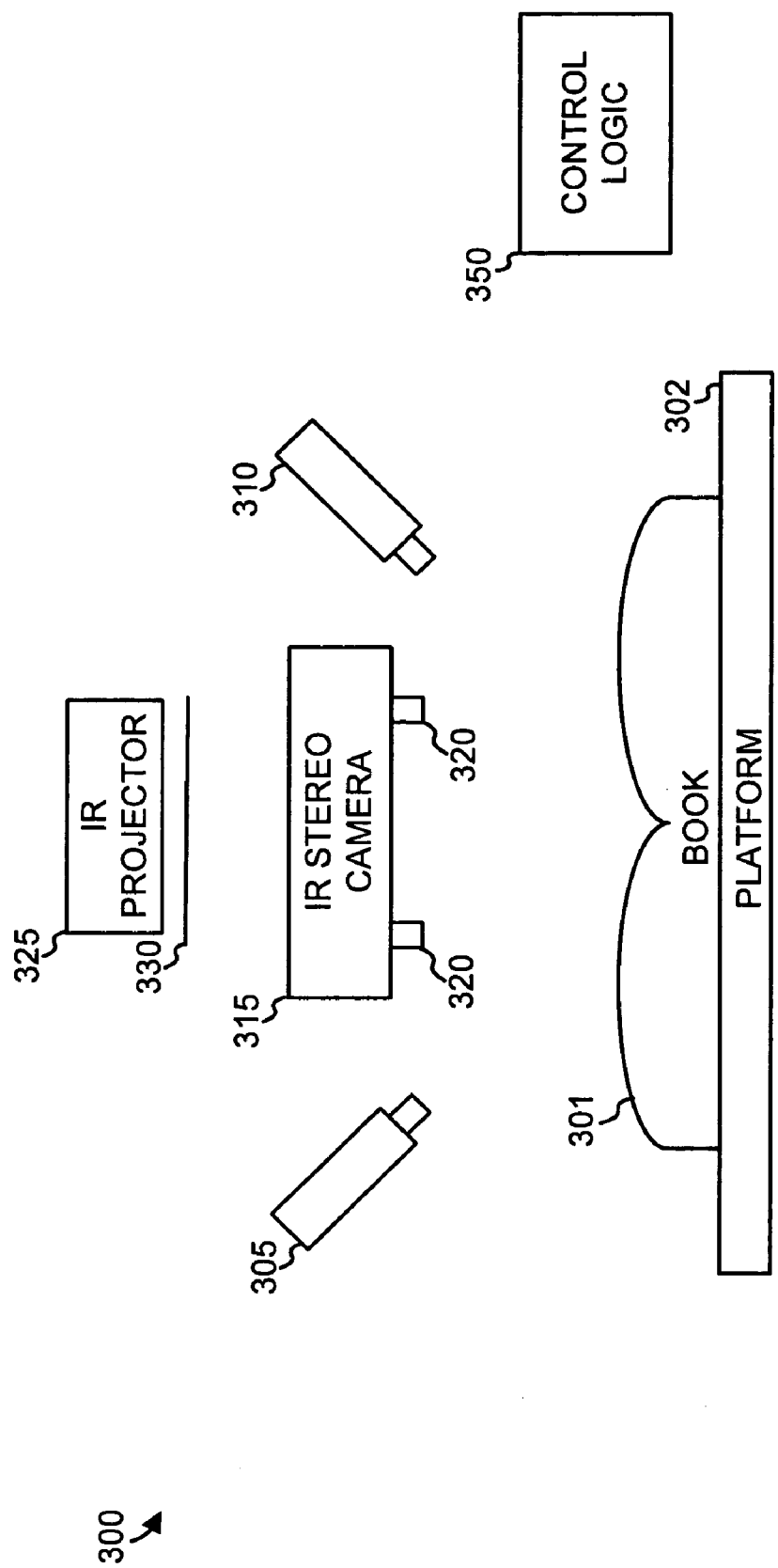
FIG. 3 is a diagram illustrating an exemplary system for optically scanning documents, such as books or magazines, to obtain images of the documents.

FIG. 3 is a diagram illustrating an exemplary system 300 for optically scanning documents, such as books, magazines, or catalogs, to obtain images of the documents. System 300 may include cameras 305 and 310 for taking two-dimensional images of a book 301 resting on a platform 302. Documents other than books, such as, for example, magazines or other documents for which it is difficult to generate a flat image of a page, may also be processed. An infra-red (IR) stereo camera 315 may include multiple imaging lenses 320 spaced at known distances from one another. An IR projector 325 may project IR radiation through a pattern mask 330 onto book 301. Control logic 350 may control the operation of system 300. For example, control logic 350 may control cameras 305, 310, and 315, and receive and process images taken by these cameras.

Cameras 305 and 310 may include high definition cameras. In some implementations, only one of cameras 305 and 310 may be used. In other implementations, additional cameras similar to cameras 305 and 310 may be used.

IR stereo camera 315, by virtue of its multiple imaging lenses 320, can take multiple images of book 301, each from different viewpoints. The images may be set to be taken in the IR spectrum. IR projector 325 may project IR radiation through pattern mask 330 onto book 301. Thus, IR stereo camera 315 may take a stereoscopic image of the pattern defined by pattern mask 330. The pattern may then be detected in the resulting image. In one implementation, the pattern may include a pattern that resembles a maze. Because the relative positions of imaging lenses 320 are known, the images can be stereoscopically combined (by, for example, control logic 350), using known stereoscopic techniques, to obtain a three-dimensional mapping of the pattern. The pattern falls on the surface of book 301, causing the three-dimensional mapping of the pattern to correspond to the three-dimensional surface of the page of the book.

Figure 4:
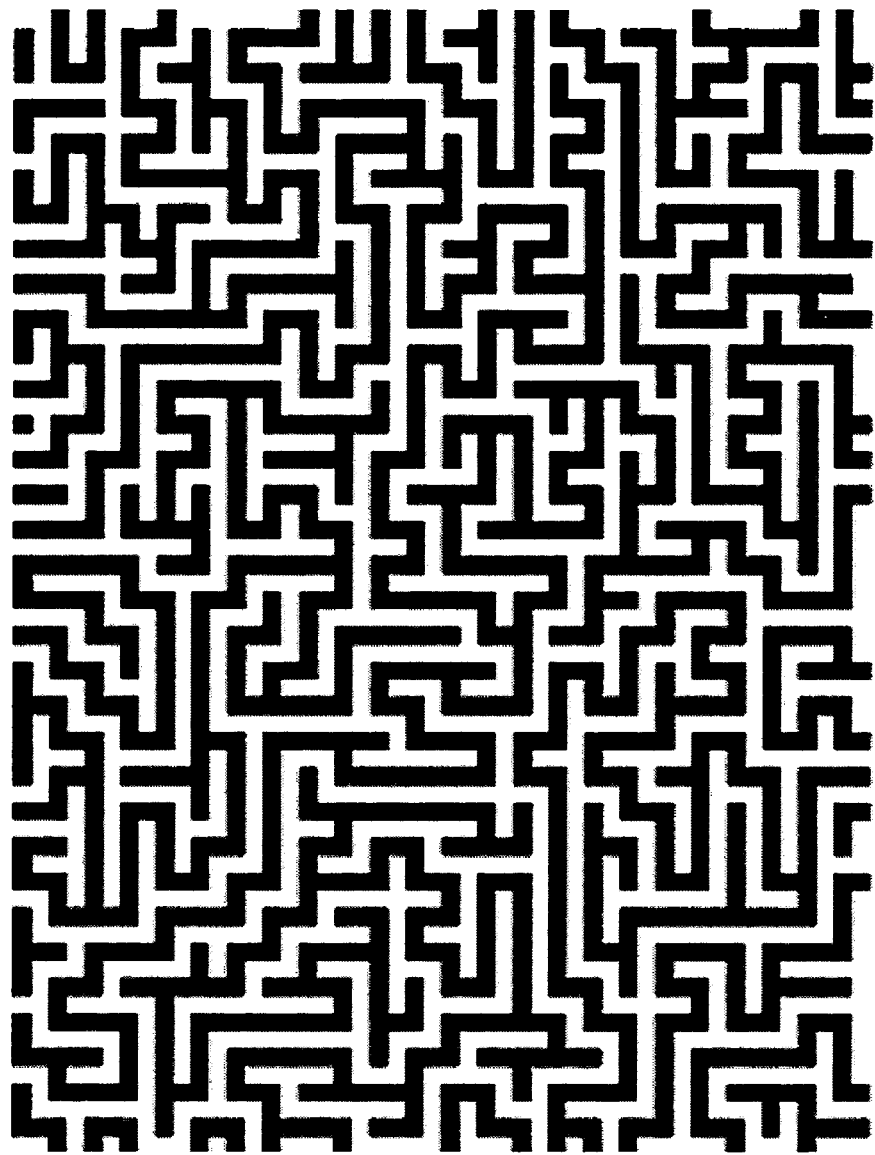
FIG. 4 is a diagram illustrating an exemplary pattern.

FIG. 4 is a diagram illustrating an exemplary portion of a pattern. The pattern may be superimposed on the surface of a three-dimensional page. Control logic 350 may detect and record the three-dimensional position of the pattern, which may be used to define the surface of a page in three-dimensional space.

Figure 5:
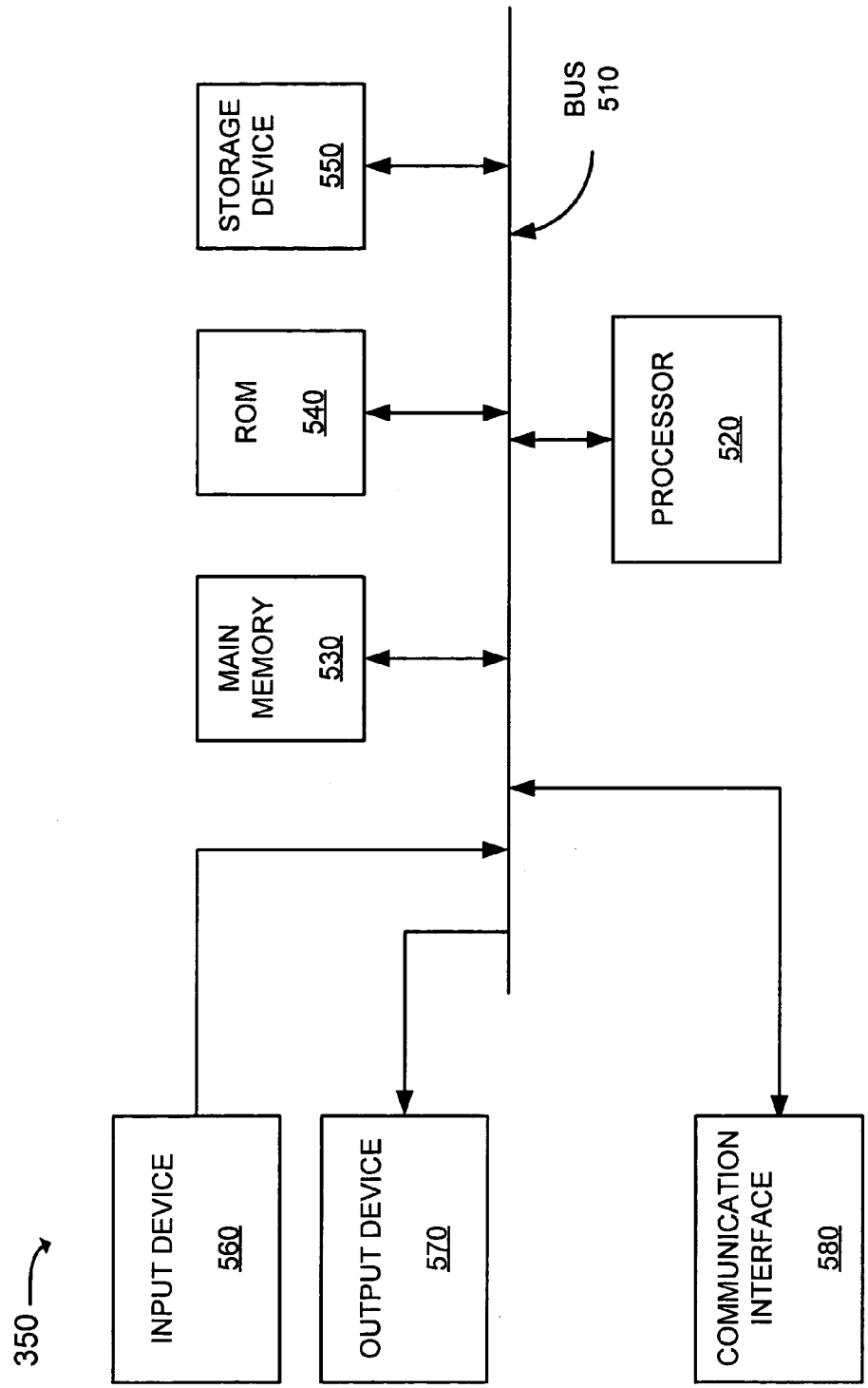
FIG. 5 is a diagram illustrating an exemplary implementation of the control logic shown in FIG. 3.

FIG. 5 is a diagram illustrating an exemplary implementation of control logic 350. Control logic 350 may include a bus 510, a processor 520, a main memory 530, a read only memory (ROM) 540, a storage device 550, an input device 560, an output device 570, and a communication interface 580. Bus 510 may include a path that permits communication among the components of control logic 350.

Processor 520 may include a conventional processor, microprocessor, or processing logic that interprets and executes instructions. Main memory 530 may include a random access memory (RAM) or another type of dynamic storage device that stores information and instructions for execution by processor 520. ROM 540 may include a conventional ROM device or another type of static storage device that stores static information and instructions for use by processor 520. Storage device 550 may include a magnetic and/or optical recording medium and its corresponding drive.

Input device 560 may include a conventional mechanism that permits a user to input information to control logic 350, such as a keyboard, a mouse, a pen, voice recognition and/or a biometric mechanism, etc. Output device 570 may include a conventional mechanism that outputs information to the user, including a display, a printer, a speaker, etc. Communication interface 580 may include any transceiver-like mechanism that enables control logic 350 to communicate with other devices and/or systems.

System Operation

Figure 6:
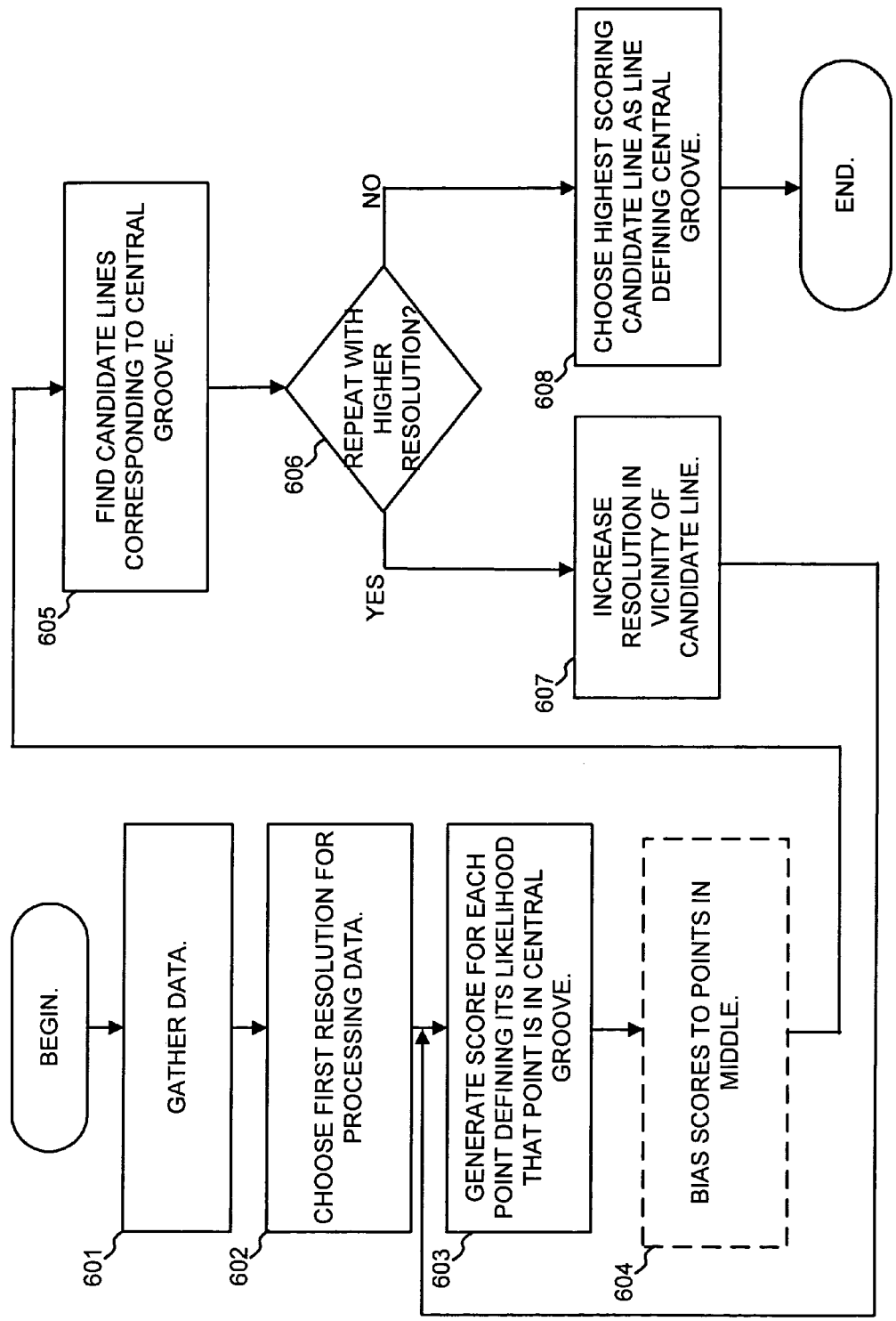
FIG. 6 is a flowchart illustrating exemplary operations of the system shown in FIG. 3 in processing a page of a document.

FIG. 6 is a flowchart illustrating exemplary operations of system 300 in processing a page of a document.

System 300 may begin by gathering data (act 601). The gathered data may include stereo images taken by IR stereo camera 315. Optionally, high definition two-dimensional images taken by cameras 310 and 305 may also be gathered; although this data is not necessary for groove detection as described herein, it may be useful for further image processing, such as OCR processing. As previously mentioned, the stereo images may include a pattern created by transmitting IR radiation from IR projector 325 through pattern mask 330 and onto the surface of the open pages in the document. The data gathered in act 601 may be saved to a computer-readable medium, and in the case of the stereo images, may be processed to match the pattern in at least two of the stereo images in order to recover the three-dimensional position of each pixel (point) in the image. The recognized three-dimensional image of objects will be referred to herein as a set of three-dimensional points that define the surface of the document (and potentially the platform) in three-dimensional space.

Figure 7A:
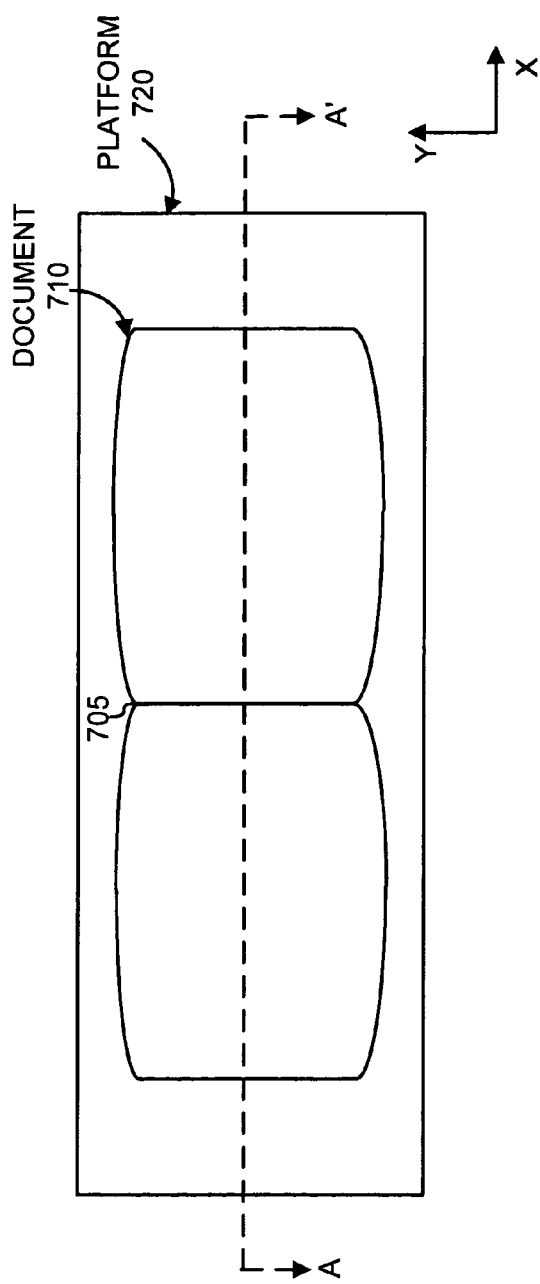
FIGS. 7A and 7B are diagrams of an opened document, such as a book, on a platform.
Figure 7B:
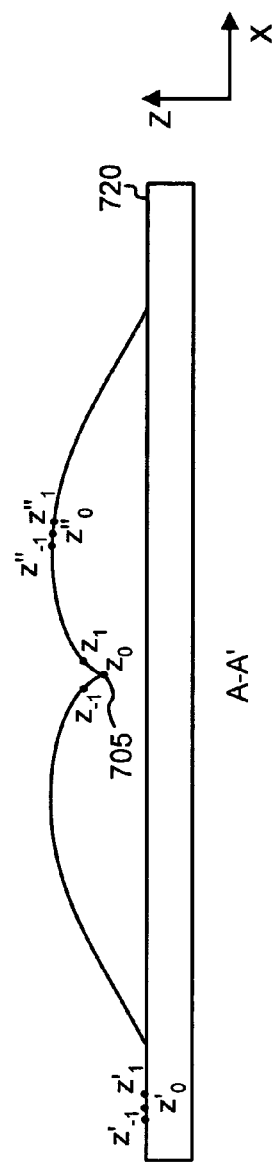

FIGS. 7A and 7B are diagrams of an opened document 710, such as a book, on a platform 720, and having a central groove 705. The set of three-dimensional points gathered in act 601 may be gathered for document 710 and platform 720. FIG. 7A is a top view of document 710. FIG. 7B is a front view of document 710 taken along the line A-A' in FIG. 7A. Document 710, which can be thought of as an object in a three-dimensional orthogonal coordinate (X,Y,Z) image space, is shown along the Y and X axes in FIG. 7A and the X and Z axes in FIG. 7B.

The three-dimensional set of points may be processed to locate the central groove of the document in a number of iterative passes over the document surface at varying levels of resolution. A first resolution may be chosen (act 602). The first resolution may be a relatively coarse resolution in which only a small subset of all the available points are used. The points may be determined as a subset of the points that are each a fixed distance from one another in the X-Y plane (FIG. 7A).

For each point in the set of points in the resolution chosen in act 602, a score may be generated (act 603). The score may be generally defined to quantify the likelihood that the point is in the central groove. For example, one score may be defined as:

$$(z_1 - z_0) + (z_{-1} - z_0), \qquad \text{(eq. 1)}$$

where $z_0$ is the Z coordinate value of the point being considered, $z_1$ is the Z coordinate value of the point immediately to the right of $z_0$ along the X axis, and $z_{-1}$ is the Z coordinate value of the point immediately to the left of $z_0$ along the X axis. Three exemplary points $z_{-1}$, $z_0$, and $z_1$ are shown in FIG. 7B for a point $z_0$ that happens to be in the central groove of document 710. As can be appreciated, the score for this point will be relatively high relative to the scores for other points. For example, the score for the points $z_{-1}'$, $z_0'$, and $z_1'$ (on platform 720) will be approximately zero and the score for the points $z_{-1}''$, $z_0''$, and $z_1''$ may be less than zero.

As an additional constraint to the score generated by equation (1), scores may optionally only be calculated for points in which $z_1 > z_0$ and $z_{-1} > z_0$. Points that do not satisfy this constraint may be assigned a predetermined value, such as zero, or may be excluded from further consideration for being in the central groove.

Figure 8:
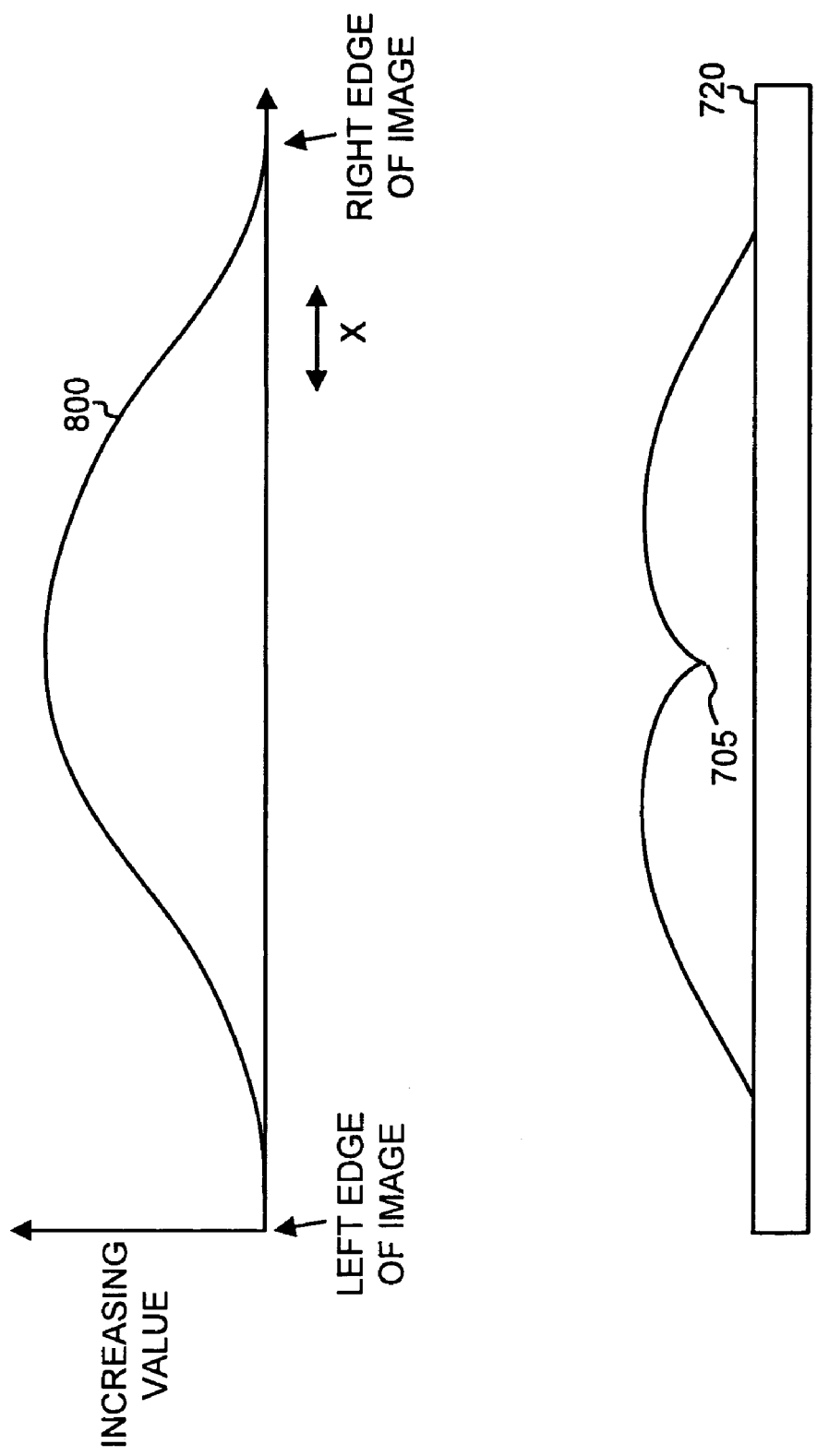
FIG. 8 is a graph illustrating an exemplary biasing function that may be applied to the points of an image.

Document 710 will normally be placed on platform 720 such that central groove 705 is in the vicinity of the middle of platform 720. The scores generated in act 603 may optionally be biased towards points that are generally in the middle of the image (act 604). For example, points towards the middle of the image may be boosted in score while points toward the edges may be reduced in score. FIG. 8 is a graph 800 illustrating an exemplary biasing function that may be applied to the points.

Based on the scores calculated in acts 603 and 604, one or more candidate lines may be determined as corresponding to central groove 705 (act 605). The candidate line(s) may be determined by searching for lines through the points that define the surface of the document for which the sum of the scores for the points in the line is maximized.

Figure 9:
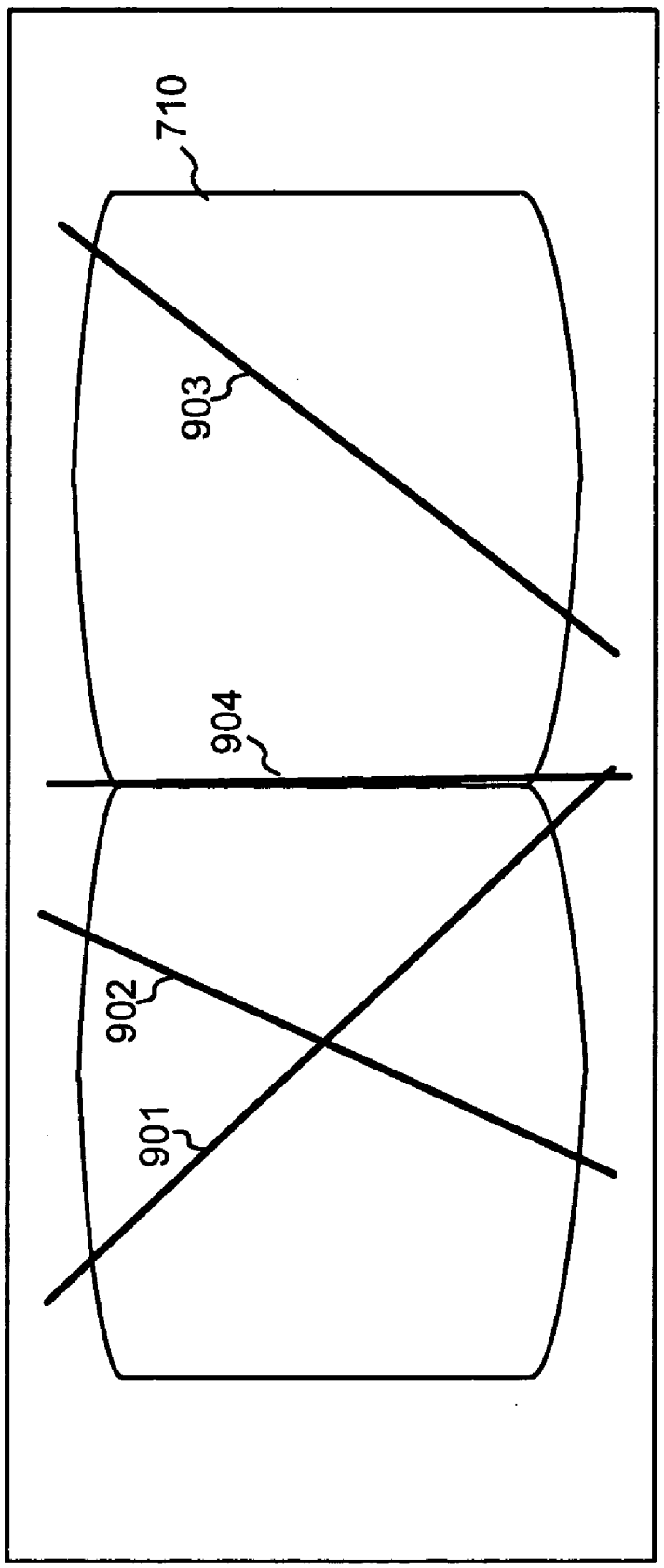
FIG. 9 is a top view of a document similar to that shown in FIG. 7A, in which a number of possible candidate lines are illustrated.

FIG. 9 is a top view of document 710, similar to that shown in FIG. 7A, in which a number of possible candidate lines are illustrated. Of the three lines 901-904, line 904, which passes near the actual center groove 705, will include points that have the highest total score. Accordingly, this line will be considered the most likely candidate line generated in act 605.

Acts 603-605 may be repeated a number of different times using successively finer resolutions. In other words, if the previous resolution of the chosen set of points was not the final resolution, the resolution in the vicinity of the most likely candidate lines can be increased by determining a new subset of the points that are each a smaller fixed distance from one another in the X-Y plane than the fixed distance used in the previous iteration (acts 606 and 607). Whether the previous iteration was the final iteration (act 606) can be determined by a number of factors, such as whether a predetermined resolution was reached (e.g., the scanned resolution of the points) or whether the score of the leading candidate line relative to the next likely candidate line is above a certain value. The highest scoring candidate line may then be determined to be central groove 705 (act 608). Control logic 350 may store an indication of the determined central groove 705 for later or immediate processing.

Exemplary System Operation

Figure 10:
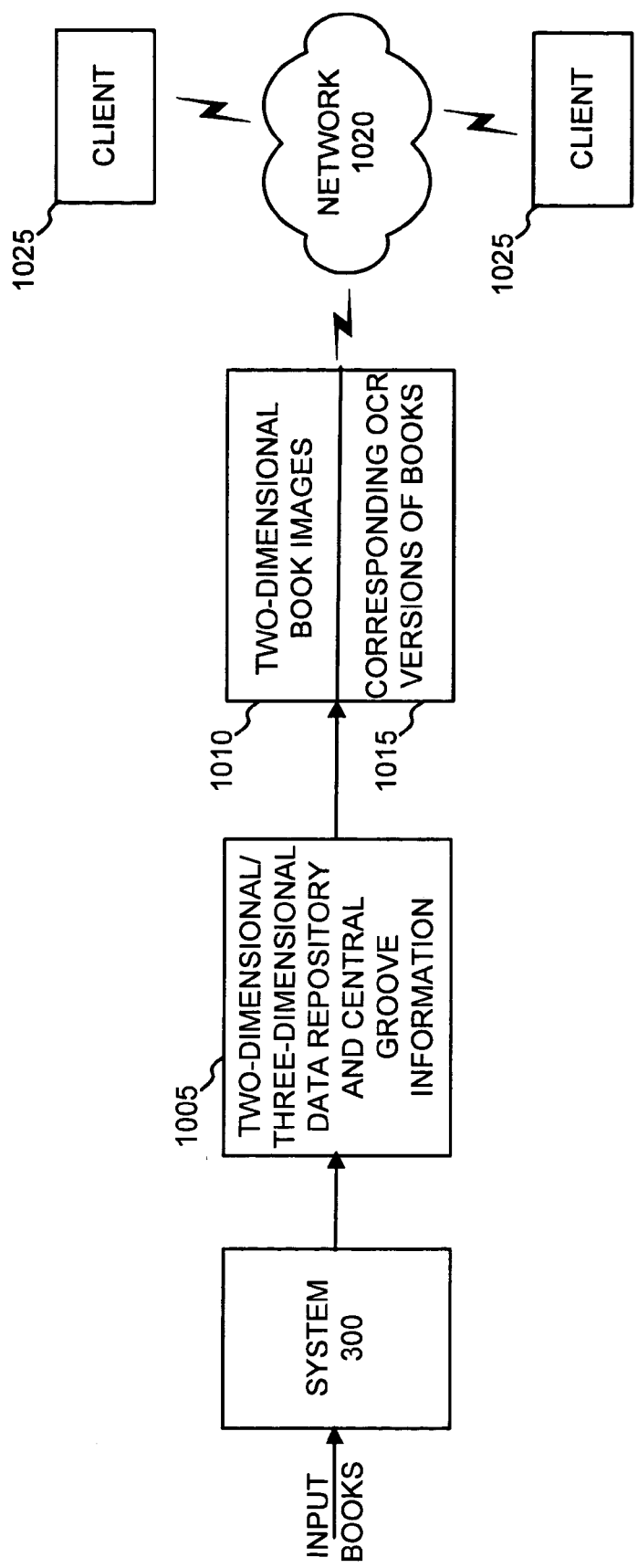
FIG. 10 is a diagram illustrating one exemplary application of the concepts described herein relating to locating a central groove in a document.

FIG. 10 is a diagram illustrating one exemplary application of the concepts described herein relating to locating a central groove in a document. Books may be scanned using a system such as that shown in FIG. 3. For example, an operator may turn each page of the current book and instruct system 300 to scan and process each page as described above. The resulting image data, including two-dimensional image data from cameras 305 and 310 and a three-dimensional map of the surface of the book may be stored in a repository 1005 along with an indication of the location of the central groove. The two-dimensional/three-dimensional data may then be processed into a more useful form. The processing may involve techniques that rely on the location of the central groove, such as de-warping the two-dimensional images of the scanned document. For example, after processing, the two-dimensional images of the book 1010 may be stored with a corresponding OCR textual version of the book 1015. One or both of the OCR textual data and the images of the pages may then be returned, over network 1020, to clients 1025 as search results.

CONCLUSION

Techniques for locating a central groove in a document, such as a book or magazine was described herein. In one implementation, the central groove was located by generating, for select three-dimensional points on the surface of the document, a score that generally defines the likelihood that the point is at a local minimum (in a "hole"). Lines are then fitted through multiple points, and the line with the maximum summed score may be considered to be a line traversing the central groove.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed:

1. A system comprising:
   an infrared projector;
   a pattern mask located in an output path of the infrared projector;
   a stereoscopic camera to generate images of opposing pages of a document from which a three-dimensional image of a surface of the opposing pages of the document is generated; and
   control logic to process the three-dimensional image to locate a groove that is defined by the spine of the document and located between the opposing pages of the document.

2. The system of claim 1, wherein the document is a book.

3. The system of claim 1, wherein the document is a magazine or catalog.

4. The system of claim 1, further comprising:
   a second camera to take two-dimensional images of the surface of the opposing pages of the document.

5. The system of claim 4, wherein the second camera includes:
   two cameras.

6. The system of claim 4, wherein the second camera is a high definition camera.

7. The system of claim 1, wherein the stereoscopic camera includes two lenses configured to take stereoscopic images.

8. The system of claim 7, wherein the stereoscopic camera includes an infrared camera.

9. A system comprising:
   a stereoscopic camera to generate images of opposing pages of a document from which a three-dimensional image of a surface of the opposing pages of the document is generated; and
   control logic to:
   calculate a score for each point in on a surface of the three-dimensional image, the score quantifying a likelihood that a particular one of the points is located in a groove defined by a spine of the document;
   locate a plurality of lines through the points; and
   identify, as the groove, one of the lines that maximizes a total score of the points that comprise the line.

10. The system of claim 9, wherein the score for a first of the points is calculated as:

$$(z_1 - z_0) + (z_{-1} - z_0),$$

where $z_0$ is the Z coordinate value of the first point, $z_1$ is the Z coordinate value of a point immediately to the right of $z_0$ along the X axis, and $z_{-1}$ is the Z coordinate value of a point immediately to the left of $z_0$ along the X axis.

11. The system of claim 9, wherein the control logic is configured to iteratively calculate the score for each of the points and locate the plurality of lines using progressively finer levels of resolution of the three-dimensional image.

12. The system of claim 9, wherein the control logic is configured to
bias the scores of the points that are located closer to a middle of the three-dimensional image more than the scores of the points that are located further from the middle of the three-dimensional image.

13. A computer-implemented method for detecting a groove defined by a spine of a document, the method comprising:
generating a score for each point on a surface of a three-dimensional image, the score quantifying a likelihood that a particular one of the points is located in the groove;
biasing the scores of the points that are located closer to a middle of the three-dimensional image more than the scores of the points that are located further from the middle of the three-dimensional image; and
detecting a location of the groove based on the biased generated scores.

14. The method of claim 13, further comprising:
fitting a plurality of lines through the points;
calculating a value for each of the plurality of lines based on the scores of the points that comprise the line; and
selecting one of the plurality of lines as a line that defines the location of the groove based on the calculated values.

15. The method of claim 14, further comprising:
calculating the value for each of the plurality of lines as a sum of the scores of the points corresponding to the line.

16. The method of claim 14, further comprising:
selecting one of the plurality of lines as the line having a maximum value.

17. The method of claim 14, further comprising:
repeating the generating the score for each of the points, the fitting the plurality of lines, and the calculating the value for each of the lines, using progressively finer resolutions of the points on the surface of the three-dimensional image.

18. The method of claim 17, wherein the progressively finer resolutions of the points on the surface of the three-dimensional image includes points located in a vicinity of a previous line that has a maximum value defines the groove.

19. The method of claim 13, wherein the document is a book.

20. The method of claim 13, wherein the document is a magazine or catalog.

21. A computer-implemented method for locating a groove defined by a spine of a document, the method comprising:
generating a score for each point on a surface of a three-dimensional image, the score quantifying a likelihood that a particular one of the points is located in the groove, wherein the score for a first of the points is calculated as:

$$(z_1 - z_0) + (z_{-1} - z_0),$$

where $z_0$ is the Z coordinate value of the first point, $z_1$ is the Z coordinate value of a point immediately to the right of $z_0$ along an axis, and $z_{-1}$ is the Z coordinate value of a point immediately to the left of $z_0$ along the axis; and
detecting a location of the groove based on the scores.

22. The method of claim 21, further comprising:
identifying, using an infrared projector, the points on the surface of the three-dimensional image.

23. A device for detecting a groove defined by a spine of a document, the device comprising:
means for generating a score for each point on a surface of a three-dimensional image, the score quantifying a likelihood that a particular one of the points is located in the groove;
means for fitting a plurality of lines through the points;
means for calculating a value for each of the plurality of lines based on the scores of the points that comprise the line; and
means for selecting one of the plurality of lines as a line that defines a location of the groove based on the calculated values.

24. The device of claim 23, wherein the device further comprises:
means for biasing the scores of the points that are located closer to a middle of the three-dimensional image more than the scores of the points that are located further from the middle of the three-dimensional image.

25. The device of claim 23, wherein the means for calculating comprises:
means for calculating the value for each of the plurality of lines as a sum of the scores of the points corresponding to the line.

26. A computer-readable medium containing instructions that when executed by a processor cause the processor to:
generate a score for each point on a surface of a three-dimensional image, the score quantifying a likelihood that a particular one of the points is located in a groove defined by a spine of the document;
fit a plurality of lines through the points;
calculate a value for each of the plurality of lines based on the scores of the points that comprise the line; and
select one of the plurality of lines as a line that defines a location of the groove based on the calculated values.

27. The computer-readable medium of claim 26, wherein the points on the surface of the three-dimensional image are generated using an infrared projector.

28. The computer-readable medium of claim 26, wherein the points on the surface of the three-dimensional image are generated using a stereoscopic infrared camera.

29. A method for detecting a groove defined by a spine of a document, the method comprising:
generating a score for each point on a surface of a three-dimensional image, the score quantifying a likelihood that a particular one of the points is located in the groove;
biasing the scores of the points that are located closer to a middle of the three-dimensional image more than the scores of the points that are located further from the middle of the three-dimensional image;
fitting a plurality of lines through the points;
calculating a value for each of the plurality of lines based on the scores of the points that comprise the line; and
selecting one of the plurality of lines as a line that defines a location of the groove based on the calculated values.

30. The method of claim 21, further comprising:
identifying, using an infrared stereoscopic camera, the points on the surface of the three-dimensional image.

31. The method of claim 29, where the calculating a value for each of the plurality of lines includes:
calculating the value for each of the plurality of lines as a sum of the scores of the points corresponding to the line.

32. The method of claim 31, wherein the selecting one of the plurality of lines as a line that defines the location of the groove further comprises:
selecting a line with a highest calculated value as the line that defines the location of the groove.

33. A computer-readable medium containing instructions that when executed by a processor cause the processor to:
  generate a score for each point on a surface of a three-dimensional image, the score quantifying a likelihood that a particular one of the points is located in a groove defined by a spine of a document;
  bias the scores of the points that are located closer to a middle of the three-dimensional image more than the scores of the points that are located further from the middle of the three-dimensional image; and
  detect a location of the groove based on the biased scores.

34. The computer-readable medium of claim 33, further comprising instructions that when executed by the processor cause the processor to:
  fit a plurality of lines through the points;
  calculate a value for each of the plurality of lines based on the scores of the points that comprise the line; and
  select one of the plurality of lines as a line that defines the location of the groove based on the calculated values.

35. The computer-readable medium of claim 34, further comprising instructions that when executed by the processor cause the processor to:
  calculate the value for each of the plurality of lines as a sum of the scores of the points corresponding to the line.

36. The computer-readable medium of claim 34, further comprising instructions that when executed by the processor cause the processor to:
  select one of the plurality of lines as the line having a maximum value.

37. The computer-readable medium of claim 33, wherein the document is a book.

38. The computer-readable medium of claim 33, wherein the document is a magazine or catalog.

39. The computer-readable medium containing instructions that when executed by a processor cause the processor to:
  generate a score for each point on a surface of a three-dimensional image, the score quantifying a likelihood that a particular one of the points is located in a groove defined by a spine of a document;
  bias the scores of the points that are located closer to a middle of the three-dimensional image more than the scores of the points that are located farther from the middle of the three-dimensional image;
  fit a plurality of lines through the points;
  calculate a value for each of the plurality of lines based on the scores of the points that comprise the line; and
  select one of the plurality of lines as a line that defines a location of the groove based on the calculated values.

40. The computer-readable medium of claim 39, further comprising instructions that when executed by the processor cause the processor to:
  calculate the value for each of the plurality of lines as a sum of the scores of the points corresponding to the line.

41. The computer-readable medium of claim 40, where, when selecting one of the plurality of lines as a line that defines the location of the groove, the instructions cause the processor to:
  select a line with a highest calculated value as the line that defines the location of the groove.

* * * * *

UNITED STATES PATENT AND TRADEMARK OFFICE
CERTIFICATE OF CORRECTION

PATENT NO. : 7,508,978 B1  Page 1 of 1
APPLICATION NO. : 10/938727
DATED : March 24, 2009
INVENTOR(S) : Francois-Marie Lefevere et al.

It is certified that error appears in the above-identified patent and that said Letters Patent is hereby corrected as shown below:

Col. 7, Claim 13, line 21, delete the word "generated"
Col. 7, Claim 18, line 45, delete the words "defines the groove"
Col. 10, Claim 39, line 12, delete the word "farther" and insert --further--

Signed and Sealed this

Twenty-third Day of June, 2009

JOHN DOLL
*Acting Director of the United States Patent and Trademark Office*